R. H. FOX & E. D. HOUSE.
RETAINER FOR BALL BEARINGS.
APPLICATION FILED MAY 22, 1916. RENEWED APR. 21, 1917.
1,246,001.
Patented Nov. 6, 1917.
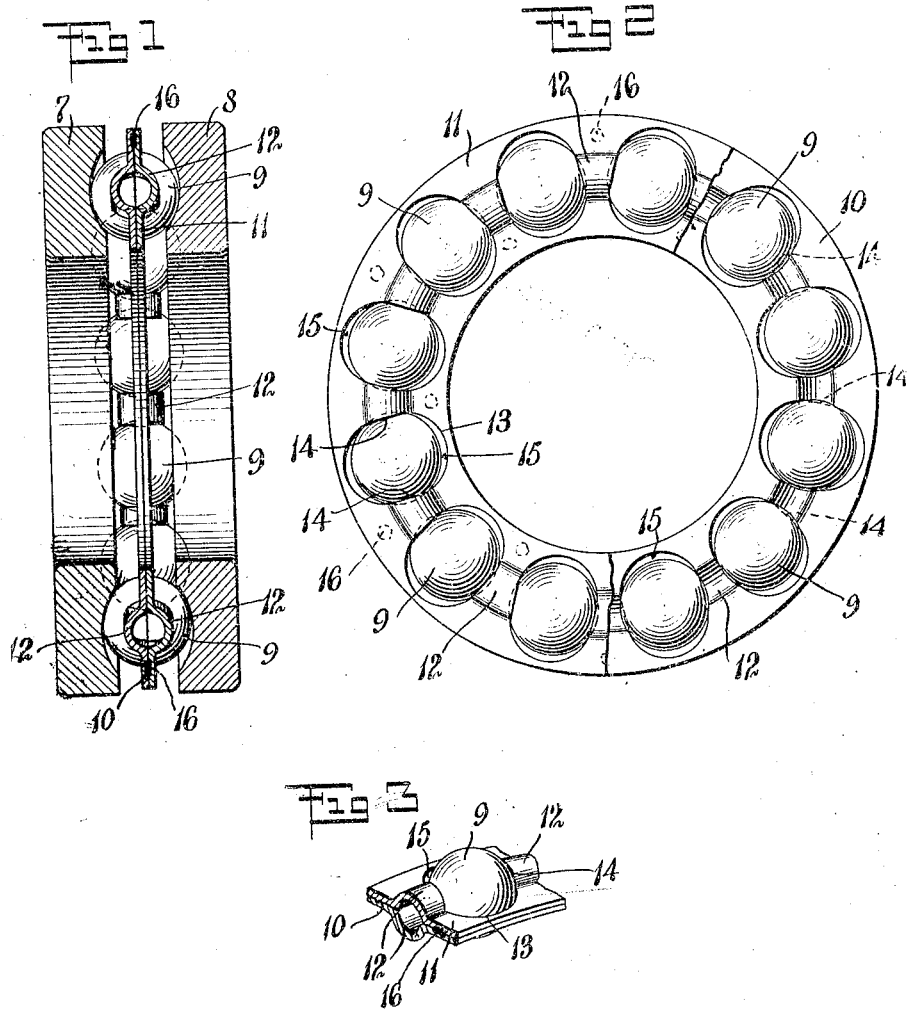
Inventors
Rudolph H. Fox
Edward D. House

UNITED STATES PATENT OFFICE.

RUDOLPH H. FOX AND EDWARD D. HOUSE, OF NEW BRITAIN, CONNECTICUT, ASSIGNORS TO THE FAFNIR BEARING COMPANY, OF NEW BRITAIN, CONNECTICUT.

RETAINER FOR BALL-BEARINGS.

1,246,001.      Specification of Letters Patent.      Patented Nov. 6, 1917.

Application filed May 22, 1916, Serial No. 99,045. Renewed April 21, 1917. Serial No. 163,708.

*To all whom it may concern:*

Be it known that we, RUDOLPH H. FOX and EDWARD D. HOUSE, citizens of the United States of America, residing at New Britain, Connecticut, have invented a new and useful Retainer for Ball-Bearings, of which the following is a specification.

This invention has reference to ball bearings and has for its objects the provision of a practical and efficient ball retainer of simple and inexpensive construction, relatively light in weight and possessing strength and durability.

These objects we have accomplished by making the retainer of two relatively flat rings secured permanently together and formed intermediate their edges with outwardly bowed corrugations through which the ball receiving openings are cut and which form ridges at the edges of the openings retaining the balls in place therein. These retainer rings are usually made up of sheet metal, possessing the necessary strength and durability such as steel and a firm method of securing them together is by "spot-welding" them at different points of contact between them.

Various other objects and features of the invention will appear as the specification proceeds, attention being directed to the accompanying drawing wherein we have illustrated the invention embodied in a practical and preferred form.

In this drawing:

Figure 1 is a cross sectional view of a thrust bearing of typical construction showing our invention incorporated therein.

Fig. 2 is a face view of the retainer detached from the bearing.

Fig. 3 is a broken detail view of a portion of the retainer.

In the bearing illustrated in Fig. 1 the thrust or load carrying elements are denoted 7 and 8 and between these elements there is a single row of running balls 9, said balls being retained and spaced by the retainer of our invention.

This retainer is made up of two rings 10 and 11 permanently secured together and shown herein as made up of relatively thin flat sheet metal such as steel or the like. These rings are formed intermediate their edges with oppositely positioned outwardly bowed corrugations 12 constituting outstanding ridges at opposite sides of the retainer which stiffen the retainer and which are used to hold the balls in place in the ball receiving openings 13. The engagement of the retaining ridges over the balls is effected by making the ball receiving openings in the plane of such ridges of lesser diameter than the diameter of the balls thereby constituting the ends of the ridges at the opposite sides of the openings, retaining fingers 14 overlying the balls sufficiently to retain them seated in the openings. In a plane substantially at right angles to the plane of the retaining ridges the ball receiving openings are preferably made of greater diameter than the balls, thereby leaving spaces 15 at the opposite sides of the balls permitting lateral or radial self-adjustment of the balls. These ball receiving openings are thus in the illustration in the form of radially elongated slots of greater length than the diameter of the balls and whose minor axis is less than the diameter of the balls, while the spacer elements are in effect a spaced series of relatively short tubes arranged in the form of a ring.

The retainer rings are suitably permanently secured together, this being accomplished, in the present instance, by bringing the opposed flat edge portions of the rings together in face-to-face engagement and "spot-welding" them at a desired number of points as indicated at 16. This forms them into a firm unitary structure which though light is strong and durable and is relatively inexpensive to make and assemble.

What we claim is:

1. A ball bearing retainer for a thrust bearing comprising opposed retainer rings having openings therethrough for the balls and provided with outwardly projecting opposed corrugations substantially in line with the centers of the ball receiving openings and forming a series of relatively short spacer tubes of less diameter than the diameter of the balls.

2. A ball bearing retainer for a thrust bearing comprising opposed retainer rings having oppositely disposed outwardly projecting corrugations therein forming relatively shorter spacer tubes, said rings having ball receiving openings extending therethrough and through the corrugations therein, said openings in the planes of said corrugations being of lesser diameter than the diameter of the balls to be retained therein whereby said balls will project partially into said spacer tubes to hold the retainer in place.

3. A ball bearing retainer for a thrust bearing comprising opposed retainer rings having oppositely disposed outwardly projecting corrugations therein forming a ring-like series of relatively short spacer tubes, said rings having ball receiving openings extending therethrough and through the corrugations therein, said openings in the planes of said corrugations being of lesser diameter than the diameter of the balls to be retained therein and being of a greater diameter than said balls in a plane at right angles to the planes of the corrugations.

4. In a ball bearing retainer, relatively flat thin retainer rings held in abutting engagement with each other and having portions between the edges thereof depressed out of the general flat planes of said rings to form retaining outstanding ridges at opposite sides of the retainer, said rings having ball receiving openings formed therein and balls seated in said openings, said openings in the planes of said retaining ridges being of lesser diameter than the balls whereby said balls are confined in the openings by the ends of the retaining ridges at the edges of said openings.

5. In a ball bearing, opposed retainer rings welded together in permanent engagement with each other, said rings having oppositely disposed outwardly projecting retaining ridges on the opposite faces thereof to form relatively short spacer tubes and provided with ball receiving openings extending through the rings and through said retaining ridges, and balls in said openings projecting partially into the open ends of said spacer tubes, said openings in the planes of the retaining ridges being of lesser diameter than the diameter of the balls whereby to constitute stops at the ends of the retaining ridges on opposite sides of the openings to partially confine the balls in the openings and to hold the spacer on said balls.

6. In a ball bearing retainer, relatively flat thin sheet metal retainer rings secured permanently together in face-to-face engagement and provided with oppositely disposed outwardly projecting corrugated portions intermediate the edges thereof, said rings having ball receiving openings extending therethrough and through the corrugated portions thereof and balls seated in said openings, said openings in the planes of said corrugated portions being of lesser diameter than the diameter of the balls to thereby constitute the ends of said corrugated portions at the opposite sides of the openings, retaining fingers to engage and hold the balls seated in the openings.

7. In a ball bearing, two bearing rings arranged side by side and having opposed ball races in their adjacent side faces, a series of balls therein, a combined ball retainer and spacer comprising two rings secured together flatwise, each of said rings having a series of relatively short spacer tubes into each end of which adjacent balls partially project to properly space said balls and to hold said retainer on said balls against accidental displacement when the parts are assembled.

RUDOLPH H. FOX.
EDWARD D. HOUSE.